United States Patent [19]
Gordon et al.

[11] Patent Number: 6,161,768
[45] Date of Patent: Dec. 19, 2000

[54] MICRO GAS TURBINE ENGINE

[75] Inventors: Richard W. Gordon, Ray; Richard Chute, Harsens Island, both of Mich.

[73] Assignee: Fairlane Tool Company, Fraser, Mich.

[21] Appl. No.: 09/457,224

[22] Filed: Dec. 8, 1999

Related U.S. Application Data

[62] Division of application No. 09/152,425, Sep. 14, 1998.

[51] Int. Cl.[7] ........................................................ B60H 1/02
[52] U.S. Cl. ............................................ 237/12.1; 237/13
[58] Field of Search ................... 237/13, 12.1; 60/39.36, 60/648; 165/48.1

[56] References Cited

U.S. PATENT DOCUMENTS

| | | |
|---|---|---|
| 4,000,608 | 1/1977 | Chute . |
| 4,000,609 | 1/1977 | Chute . |
| 4,034,560 | 7/1977 | Chute et al. . |
| 4,086,760 | 5/1978 | Chute . |
| 5,526,640 | 6/1996 | Brooks et al. . |

OTHER PUBLICATIONS

K.W. Van Treuren, D.N. Barlow, W.H. Heiser, M.J. Wagner, N.H. Forster, "Investigation of Vapor–Phase Lubrication In A Gas Turbine Engine," Apr. 1998, *Journal of Engineering for Gas Turbines and Power*, vol. 120, pp. 257–262.

*Primary Examiner*—Harold Joyce
*Assistant Examiner*—Derek S. Boles
*Attorney, Agent, or Firm*—Harness, Dickey & Pierce

[57] ABSTRACT

The present invention provides a turbo heater which utilizes a gas turbine engine and a heat exchanger assembly. The gas turbine engine is adapted to efficiently operate over a prolonged period of time and at varying power outputs without adverse or detrimental effects to the components thereof. For example, the gas turbine engine includes bearing assemblies and a fuel delivery systems which are uniquely designed for the demands of repeated cycling (i.e. starting and stopping), as well as operation at various power outputs without damage to the gas turbine engine. In addition, the use of exhaust gas from the gas turbine engine eliminates direct impingement of combustion on the heat exchanger element, thereby significantly increasing the durability and life span of the turbo heater.

28 Claims, 7 Drawing Sheets

MICRO GAS TURBINE ENGINE

This is a division of U.S. patent application Ser. No. 09/152,425, filed Sep. 14, 1998.

FIELD OF THE INVENTION

The present invention relates to a gas powered co-generator, and more particularly, to a self-sustaining co-generator which utilizes a micro gas turbine engine and heat exchanger for generating heat and rotary drive power.

BACKGROUND AND SUMMARY OF THE INVENTION

Micro gas turbine engines are well-known in the art and have found particular utility in powering projectiles such as a missile. In this application, the turbine engine is operated in a substantially constant environment and for a relatively limited duration. In addition, the turbine engine is typically cycled once (i.e. started once and stopped once) and operated at a near maximum output generation. As such the operating conditions are substantially constant and well defined. Furthermore, the internal components of the gas turbine engine, such as the bearings, are not subjected to repeated cycling through a range of operating speeds.

However, to date, micro gas turbine engines have not proven useful in applications where the engine is required to operate in a variety of environments over a prolonged period of time at less than maximum output generation. A primary difficulty has been the inability to properly cool and lubricate the bearing assemblies. Thus, micro gas turbine engines have not been used in applications which require repeated cycling and/or operation in many different environments such as co-generation.

Instead co-generators have been developed which use separate heat generating and power generating sources. For example, gas heaters or furnaces typically use a fuel which is delivered to a burn chamber where the fuel is ignited and a blower unit powered by an external power source which blows the heated air generated in the combustion chamber out of the heater. Accordingly, systems of this type do not take advantage of the heat by-product generated during power generation.

The present invention provides a self-sustaining system wherein a gas turbine engine functions as a power head for a co-generator to generate heat and rotary drive power for driving the fan of the heat exchanger, as well as the auxiliary components of the engine such as an electrical generator for charging a battery which operates the other components of the system. The overall concept of the present invention is to provide a co-generator which utilizes a micro gas turbine engine for both energy generating functions.

A primary object of the present invention is to provide a co-generator which is substantially smaller, and thus portable, than current systems for a given heat generating capacity.

A further object of the present invention is to provide a gas turbine engine as a power head for the generation of heat, thereby eliminating direct impingement of combustion on a heat exchanger element, and significantly increasing the durability and life span of the heater unit.

Another object of the present invention is to provide a quick-starting, self-sustaining co-generator which is rugged in design and has the ability to operate in adverse locations (e.g. on temporary platforms) and in adverse conditions (e.g. sub-zero temperatures).

An additional object of the present invention is to provide a self-contained co-generator in which at least a portion of the gas turbine engine is coaxially located with and surrounded by an annular heat exchanger such that the gas turbine engine is protected and muffled.

A further object of the present invention is to provide an extremely high efficiency co-generator which converts a high percentage of the energy of the fuel.

Still a further object of the present invention is to provide a bearing assembly for a gas turbine engine which is effectively cooled and lubricated by the combustion fuel such that the gas turbine engine can be repeatedly started and stopped, as well as operated at various power outputs without damage to the bearing assembly.

In a preferred embodiment, the present invention generally includes a gas turbine engine having a combustor which is coaxially arranged with the compressor and turbine such that the micro turbo heater housing surrounds the gas turbine engine. The turbo heater further includes a heat exchanger assembly which may take the form of a simple housing, an air-to-air heat exchanger, an air-to-liquid heat exchanger, a catalytic converter, or any combination thereof. In this manner, the turbo heater can be used to generate a heated air supply, a heated water supply or both a heated water supply and a heated air supply. Furthermore, the carbon monoxide content of the heated air can be controlled depending on the particular application.

Further scope of applicability of the present invention will become apparent from the detailed description provided hereinafter. It should be understood however that the detailed description and specific examples, while indicating preferred embodiments of the invention, are intended for purposes of illustration only, since various changes and modifications within the spirit and scope of the invention will become apparent to those skilled in the art from this detailed description.

BRIEF DESCRIPTION OF THE DRAWINGS

The present invention will become more fully understood from the detailed description and the accompanying drawings wherein.

DETAILED DESCRIPTION OF THE PREFERRED EMBODIMENTS

Figure 1:
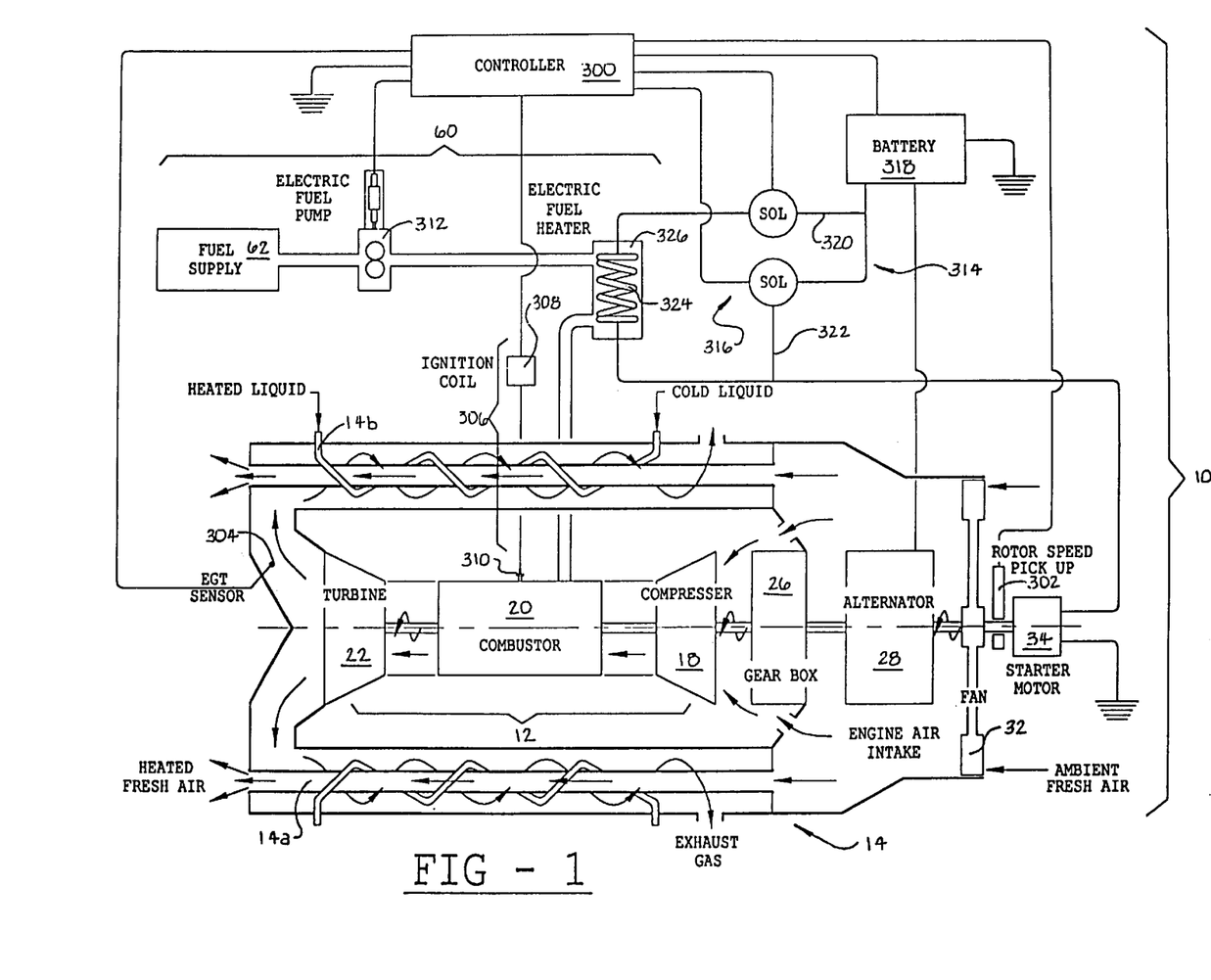
FIG. 1 is a schematic view of a preferred embodiment of the turbo heater of the present invention in which a gas turbine engine is coaxially located within an annular heat exchanger.
Figure 2:
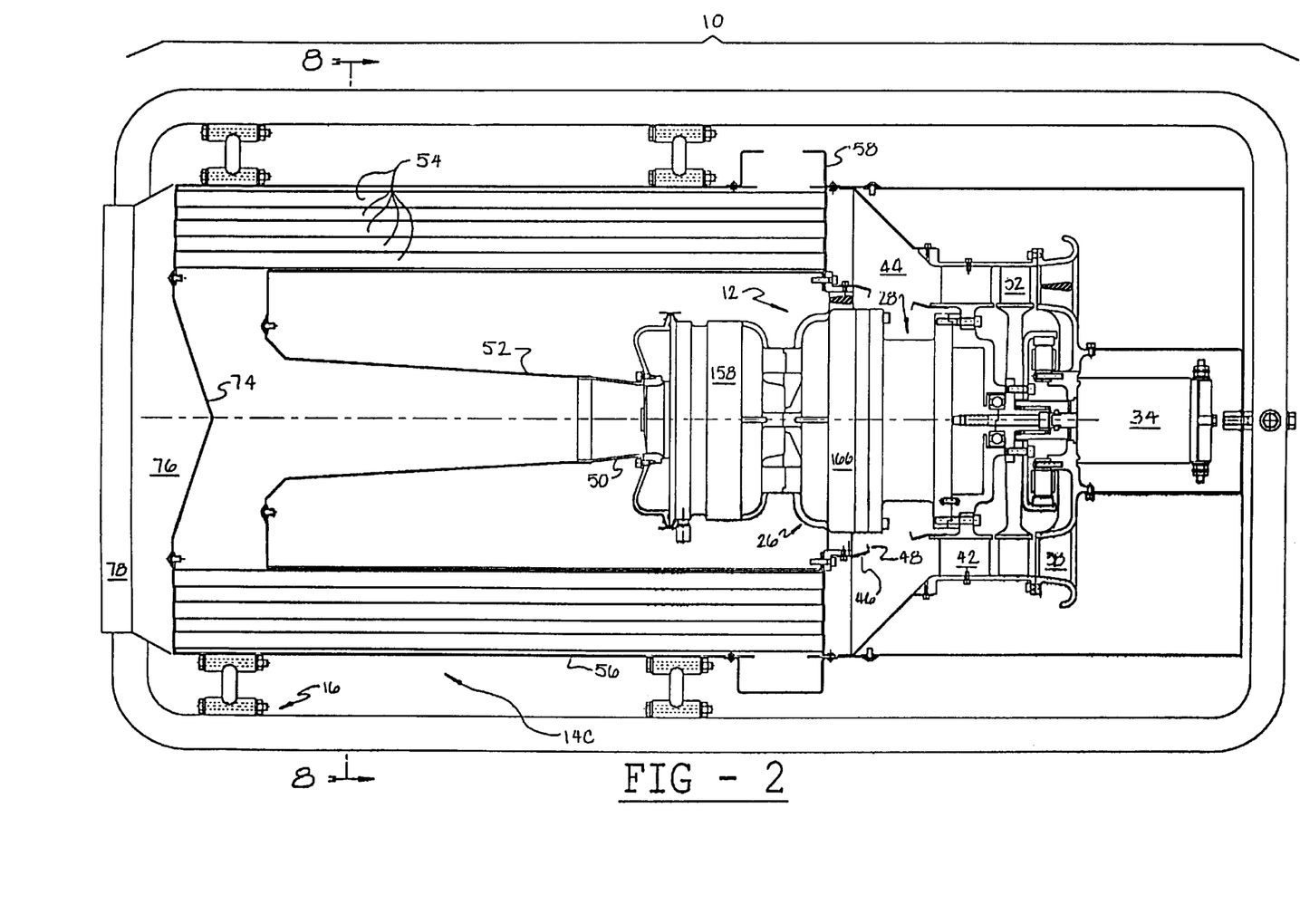
FIG. 2 is a partial cross-sectional view of the turbo heater of the present invention schematically illustrated in FIG. 1.

The co-generator or turbo heater in accordance with the present invention is described in further detail with reference to a preferred embodiment. With reference now to FIGS. 1 and 2, the turbo heater 10 in accordance with the preferred embodiment includes a gas turbine engine 12 and a reverse-flow heat exchanger 14 which are supported within a frame assembly 16. Gas turbine engine 12 draws ambient air through a compressor 18, receives fuel from a fuel system 60 to form an air-fuel mixture, combusts the air-fuel mixture in a combustor 20 and discharges and expands the exhaust gases through a turbine 22. As such, gas turbine engine 12 provides a source of heat as well as a source of rotary power. The rotating components of gas turbine engine 12, namely compressor 18 and turbine 22, are mounted on a common high-speed shaft assembly 24. The shaft assembly 24 is coupled through a reduction gear assembly or gear box 26 to a generator set 28 including a pair of electrical alternators 28a, 28b, an axial fan 32 and a starter motor 34. The starter motor 34 is coupled to the axial fan 32 through a one-way over-running clutch assembly 36 which permits power transmission in a first rotational direction and free wheeling in a second rotational direction. A presently preferred one-way over-running clutch assembly is Clutch No. RCB-121616 available from The Torrington Company of Torrington, Conn.

With particular reference to FIG. 2, ambient fresh air is propelled into the turbo heater 10 between inlet struts 38 adjacent to the axial fan 32. Diffuser blades 42 are disposed on a downstream side of the axial fan 32 adjacent to plenum 44. Plenum 44 opens into inner shield 46, as well as into the heat exchanger 14 and thus, inlet air is directed into heat exchanger 14 and also through ports 48 formed through inner shield 46. Subsequently, the air which passes through ports 48 is consumed by the gas turbine engine 12.

An exhaust diffuser duct 52 is connected to the gas turbine engine 12 and communicates via the exhaust header pipe 50 with the heat exchanger 14 which includes a plurality of clean air tubes 54 disposed within turbo heater housing 56. The exhaust gases from gas turbine engine 12 pass between and over clean air tubes 54 and exit through exhaust collector ring 58 disposed on opposite sides of housing 56. As presently preferred, the exhaust header pipe 50 is dimensioned such that the exhaust gases are discharged at a pressure slightly above atmospheric to facilitate the transfer of heat from the exhaust gases to the fresh air in the heat exchanger 14. More specifically, the exhaust gas has a tendency to stick to the tubes 54 and increase the heat transfer efficiency. Fresh air is propelled through the interior of the tubes 54 by the axial fan 32 which is disposed on a forward end of the heat exchanger 14 and powered by the gas turbine engine 12.

Figure 3:
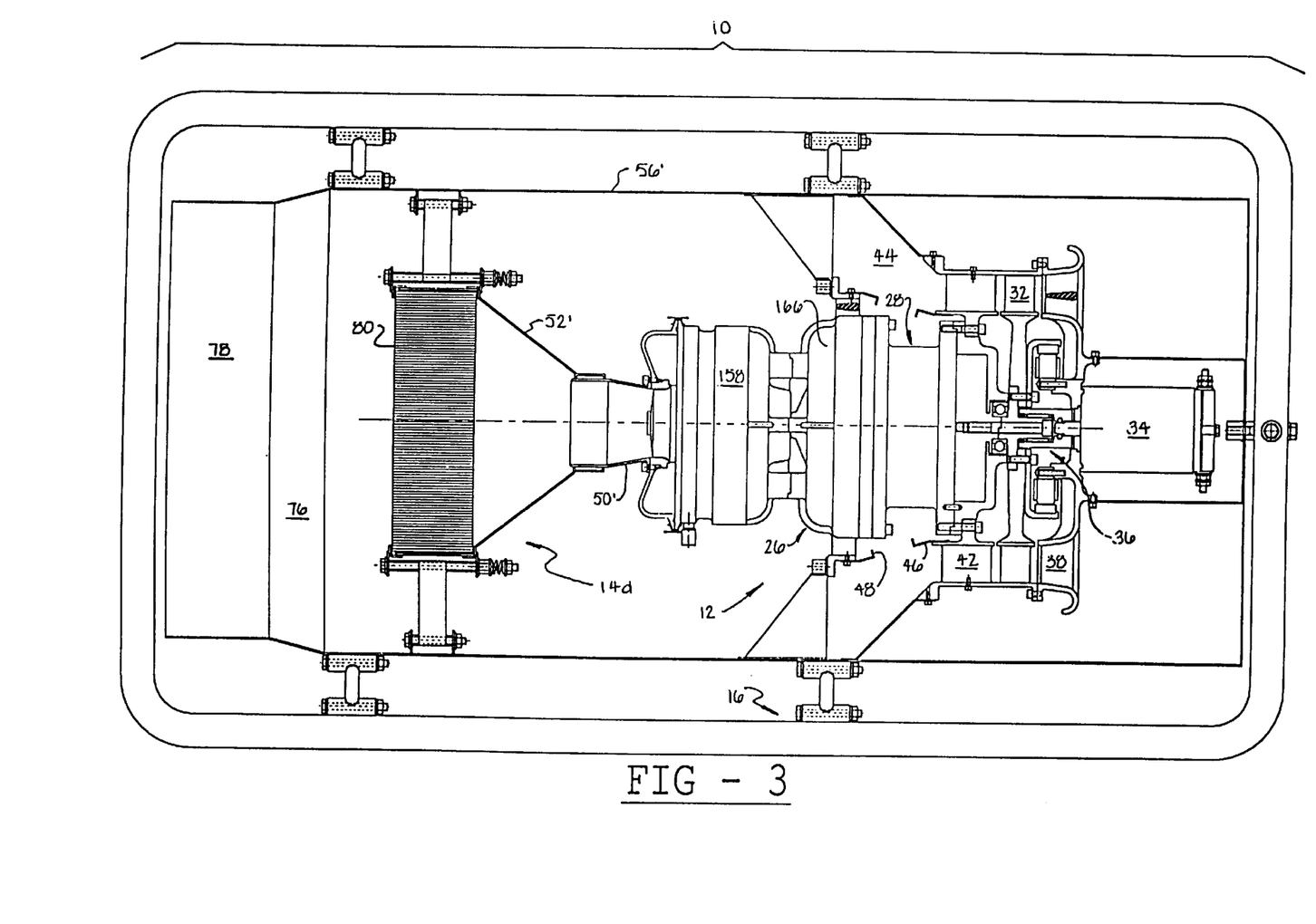
FIG. 3 illustrates a modification to the turbo heater illustrated in FIG. 2 in which the heat exchanger is replaced by a catalytic converter.

Turbo heater 10 is a diesel fueled self-contained and self-sustaining heating system for supplying heated air and electrical power in remote locations. Gas turbine engine 12 is designed to supply the majority of its energy as heat in the form of exhaust gases, and a minor amount as shaft power used to drive the axial fan 32 and the electrical generator set 28. Heat exchanger 14 is used to recover the resulting heat in the exhaust gases. In this regard, turbo heater 10 may be equipped with a combination air-to-air heat exchanger 14a and an air-to-liquid heat exchanger or liquid coil 14b to supply both heated air and heated liquid as illustrated in FIG. 1, an air-to-air heat exchanger 14c to supply heated, breathable air as illustrated in FIG. 2. If desired, the heat exchanger 14 could also be of a liquid coil type to supply only heated liquid. Alternately, turbo heater 10 may be fitted with a suitable catalytic converter 14d which reduces the carbon monoxide in the exhaust gases to supply essentially breathable heated air as illustrated in FIG. 3. In certain limited circumstances where the air quality is not an issue, the turbo heater 10 may be configured such that heated air is provided directly from the exhaust of gas turbine engine 12 and blended with fresh air supplied by the axial fan 32.

Turbo heater 10 is designed to feature economical construction and is especially designed for reduced manufacturing cost. The internal aerodynamics, such as the turbine and compressor wheels, use well-developed turbocharger technology. For example, the preferred flow and pressure ratios are nearly optimum for automotive turbocharger components, and are thus near-optimum for use in the turbo heater 10. A peak cycle temperature of 1500° Fahrenheit (° F.) is preferred to allow the use of economical materials for the high temperature components. For instance, combustor 20 of gas turbine engine 12 is fabricated from aluminized steel which is less than a one-third the cost of high nickel sheet alloys typically used in gas turbines operating at higher temperatures. The 1500° F. gases are expanded in turbine 22 and exhausted into the heat exchanger 14 at a maximum of 1300° F. Therefore, the heat exchanger assembly 14 can be made from less expensive materials than those used in connection with direct fired units operating at temperatures up to 2500° F. without sacrificing durability.

Gas turbine engine 12 consists of a radial flow (centrifugal) compressor 18, annular combustor 20 and radial flow turbine 22. The compressor 18 and turbine 22 are attached to a common high speed shaft assembly 24 and the annular combustor 20 is located therebetween. More specifically, the high speed shaft assembly 24 passes through the center of the combustor 20 with the compressor 18 positioned on one side and the turbine 22 positioned on the other side thereof. With the shaft 24 rotating at approximately 125,000 revolutions per minute (rpm), the compressor 18 takes in ambient air at a rate of about 0.5 pounds per second (lbs/sec) or approximately 371 standard cubic feet per minute (scfm). Thus, at an ambient temperature of 32 degrees Fahrenheit (° F.), the inlet air is compressed to about 15 pounds per square inch gage (psig) above ambient pressure which is standard at 14.7 psia (absolute). As the compressor pressure is approximately twice the pressure of the ambient pressure, the compressor 18 is said to have a pressure ratio of approximately two to one (2:1).

The combustor 20 is supplied with pressurized air at a ratio of approximately two to one and diesel fuel is added to form an air-fuel mixture which is ignited therein. The air-fuel mixture burns steadily after the initial ignition and generates an exhaust gas having an elevated temperature preferably not exceeding 1500° F. The exhaust gas is discharged from the combustor 20, expanded in the radial turbine 22, and exhausted into the heat exchanger assembly 14. When the hot gases are expanded at a pressure slightly less than the compressor discharge, enough power is created to drive the compressor 18 as well as to drive the axial fan 32 for delivering the air, and the electrical generator set 28 supplying turbo heater accessory power and surplus power for lights or tools. The rate of fuel flow provided by a fuel system 60 is used to modulate the output of the turbo heater 10. For example, a fuel flow rate of approximately 32 pounds per hour (lbs/hr) generates approximately 500,000

British thermal units per hour (Btu/hr) of fresh heated air. The combustor 20 on the turbo heater 10 is different from those used in heating applications since the gas turbine engine 12 is designed to operate at a pressure twice that of atmospheric pressure and the velocity of the air entering the combustor 20 is created by a 1 psi pressure drop, yielding combustor mixing jet velocities over 200 feet per second (ft/s) which are significantly greater than a combustor typically used in heating application with an air supplied by a low pressure blower. These conditions increase the combustor burning intensity such that a reduced combustor volume, on the order of twenty-five percent to thirty-three percent (25%–33%) the volume of a conventional, atmospheric combustor/burner. This dramatic reduction in volume is characteristic of the turbo heater design. For example, a 500,000 Btu/hr turbo heater may be designed to fit into a 22"×22"×42" frame and weigh less than 200 pounds (lbs), making it relatively portable (except for a remote fuel supply 62).

The high speed shaft assembly 24 which rotates on its mass center by means of elastically mounted bearings is vibration-free for all practical purposes. Therefore, the turbo heater 10 can be located onto temporary platforms and safely operated there. The fuel supply for an 8 hour day (about 50 gallons or 300 pounds) can be provided from a portable tank 62 or a ground level reservoir and pumped through a flexible hose as desired. These features allow the turbo heater 10 to be used in many ways not currently available for conventional heaters. The axial flow fan 32 is also designed to deliver breathable fresh air at a pressure which is sufficiently high enough to inflate moderately-sized portable structures having an approximate internal volume of 20,000 cubic feet.

Figure 4:
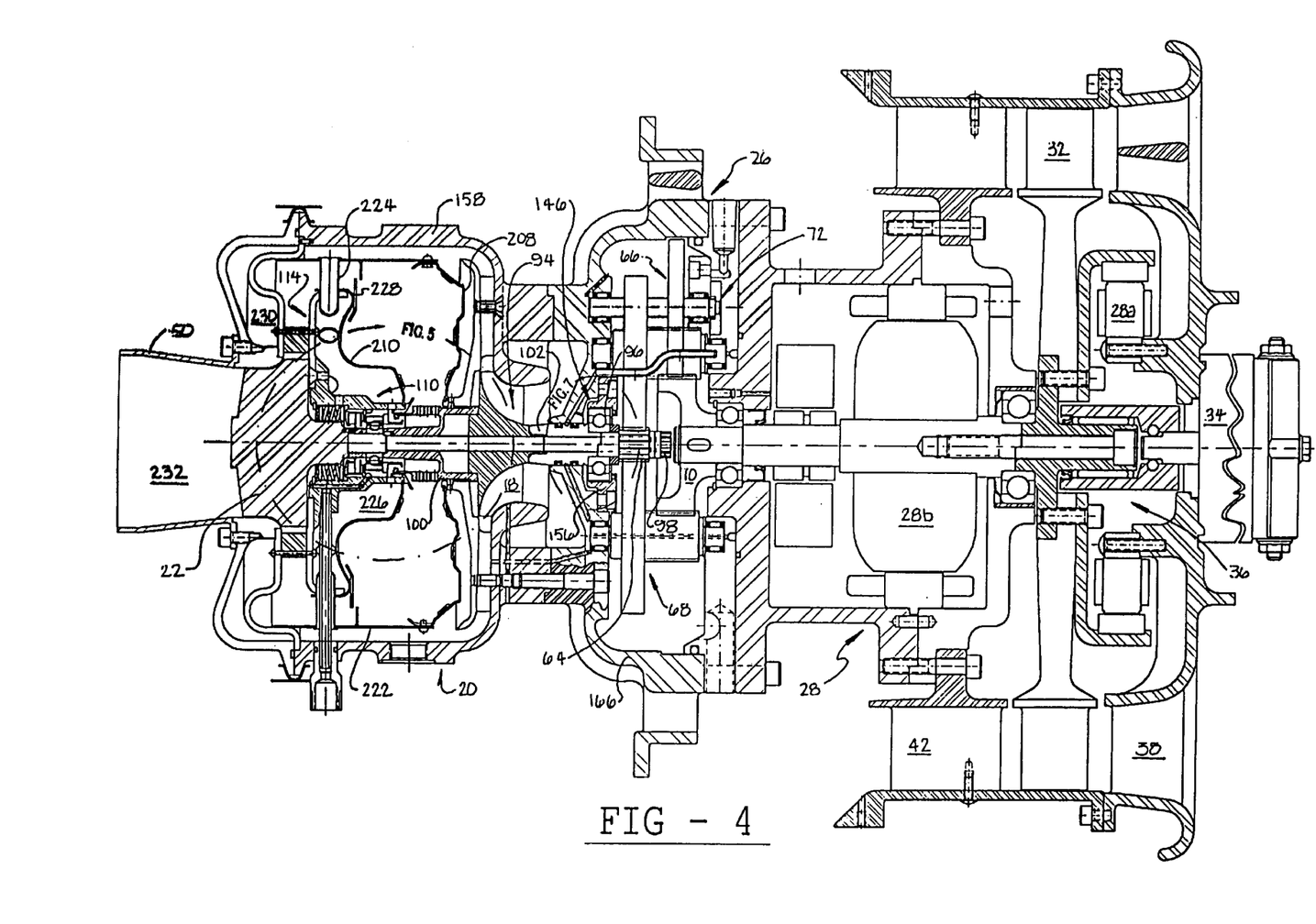
FIG. 4 is a partial cross-sectional view of the gas turbine engine of the present invention illustrated in FIG. 2.
Figure 7:
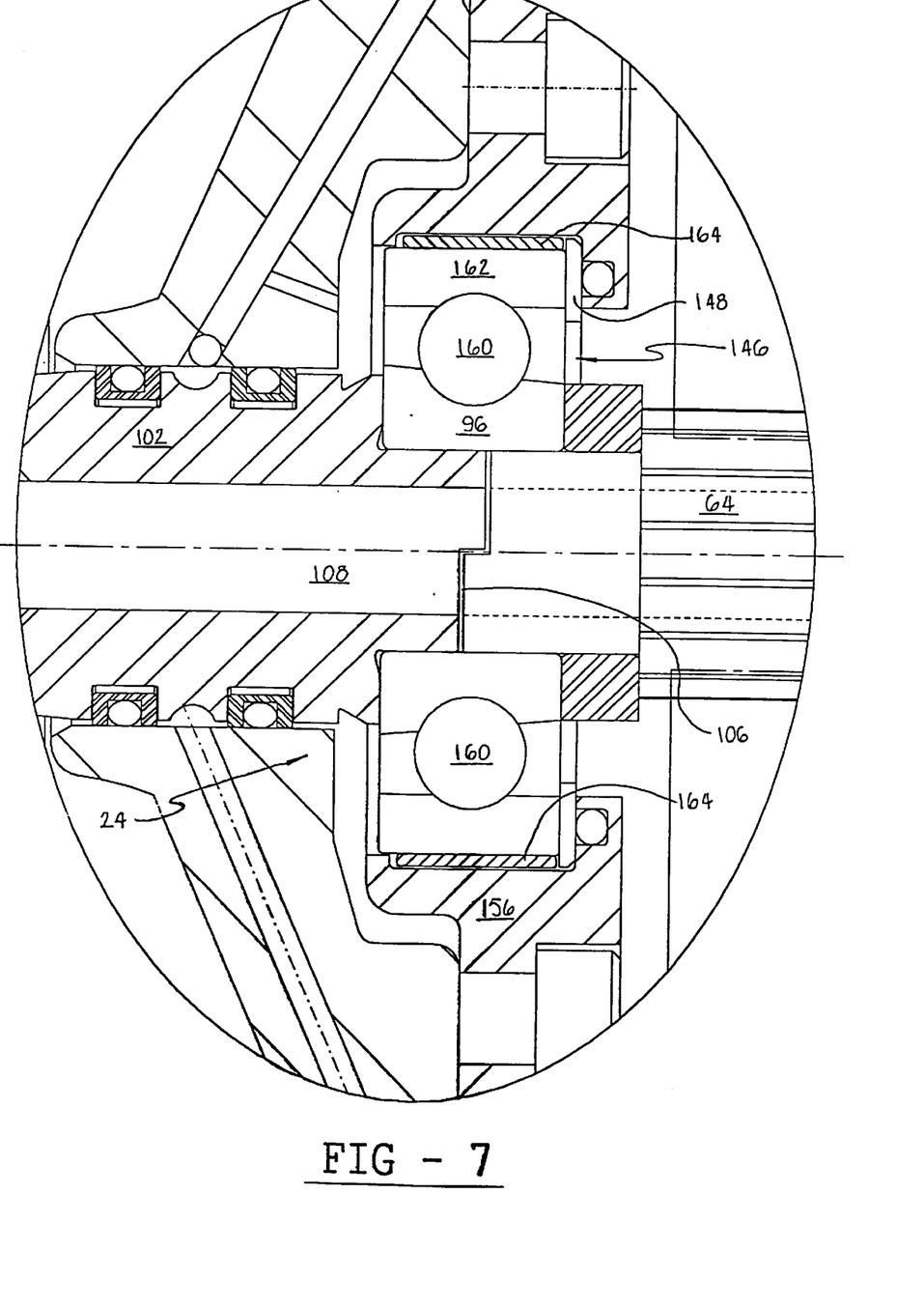
FIG. 7 is a detailed view illustrating the interface between the shaft assembly of the gas turbine engine and the gear reduction assembly.

A reduction gear assembly or gear box 26 is interdisposed between the high speed shaft assembly 24 and the other rotating components of the turbo heater 10 such that economical, well developed, efficient components can be used. With reference to FIGS. 4 and 7, gear box 26 includes a pinion gear 64 disposed on an end of the high speed shaft assembly 24, a pair of counter-rotating gear sets 66, 68 and an output shaft 70. As such, gear box 26 has two reduction stages which yield an final drive ratio of 15 to 1 (15:1), making the output shaft speed a nominal 8,333 rpm. As further described hereinafter, the pinion gear 64 is rotationally supported by an elastically mounted front bearing assembly 146 which provides load sharing between the counter-rotating gear sets 66, 68. The gear box 26 is a self-contained unit having an oil pump 72 disposed therein. The output shaft 70 from the gear box 26 drives the electrical generator set 28. As presently preferred, a small electric alternator 28a, such as typically used in automotive applications, supplies 12 volts and 20 amperes (thereby consuming approximately 2000 Btu/hr) and produces the electrical power necessary to perform turbo heater functions such as charging the battery, powering the system control, operating the fuel pump and supplying the ignition energy. A larger electrical generator 28b produces up to 3 kilowatts of surplus electrical power (thereby consuming approximately 14,000 Btu/hr). The gear box 26 also drives the axial fan 32 that supplies the necessary fresh air flow at about 2000 cfm and at relatively low pressures about ⅓ psi (thereby consuming approximately 15,000 Btu/hr). Thus, the heat equivalent of the total shaft power amounts to less than 31,000 Btu/hr, which is approximately 6.2% of the total heat output of the turbo heater 10. Thus, a feature of the turbo heater 10 is that approximately 97% of the energy in the fuel, less the equivalent shaft energy, enters the heat exchanger 14, as compared to conventional systems which require auxiliary power that is not converted to usable heat.

Figure 8:
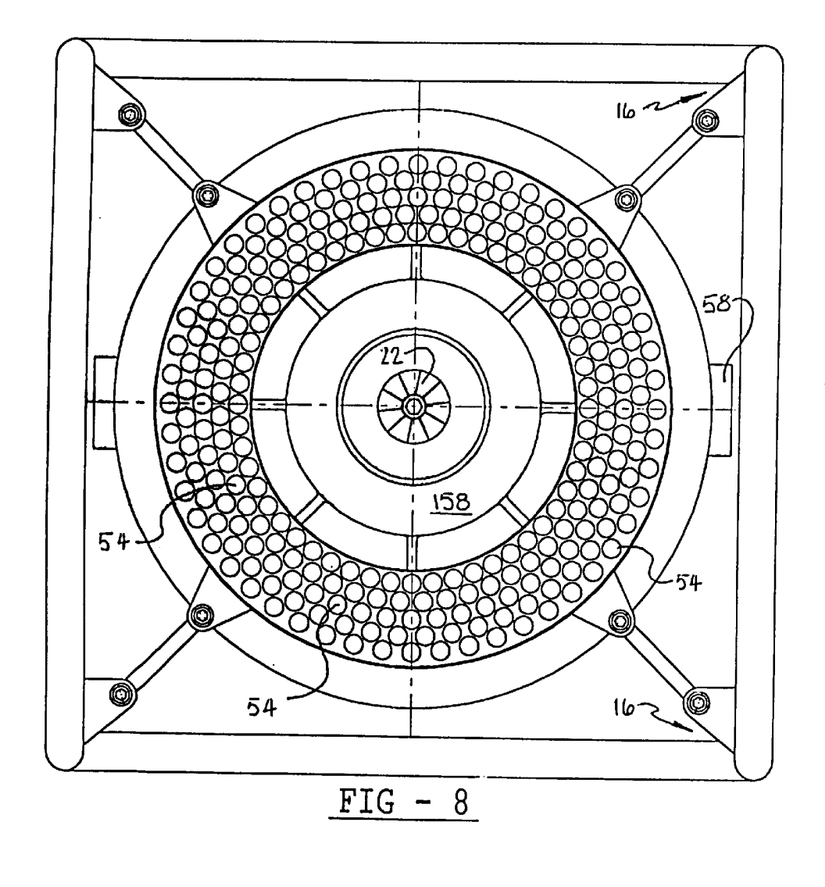
FIG. 8 is a cross-sectional view of the heat exchanger of the present invention taken along line VIII—VIII in FIG. 2.

With particular reference to FIGS. 2 and 8, the annular heat exchanger 14 is generally cylindrically shaped and formed by an annular bundle of tubes 54 such that the gas turbine engine 12 and the gear box 26 are contained inside the annulus defined by the heat exchanger 14. In this manner, the critical dynamic components of the turbo heater 10 are both protected from damaging impacts thereto and contained to control the sound emanating therefrom. Exhaust from the gas turbine engine 12 enters a diffuser duct 74 and is directed into the hot gas side of the heat exchanger 14. The heat exchanger 14 is a counter-flow type exchanger wherein the hot exhaust gas travels forward between the heat exchanger tubes 54 to an exhaust collector ring 58 located at the front of the heat exchanger 14 where it is released to the atmosphere. When discharged from the turbo heater 10, the exhaust gases are relatively cool having given up over 80% of the available heat content. Fresh air driven by the axial fan 32 enters the tubes 54 at the front of the heat exchanger 14 and flows straight rearward, acquiring approximately 80% of the available heat. As best seen in FIG. 2, a collector 76 and suitable exhaust pipe 78 may be provided at the rear of the heat exchanger 14 to operably connect the turbo heater 10 into an air handling system. The resulting fresh, breathable heated air is supplied at a rate up to 500,000 Btu/hr and temperatures to over 250° F. and a pressure of approximately ¼ psig. The pressure and flow capabilities of the axial fan 32 generate a positive pressure differential between the fresh air in the tubes 54 and the exhaust gases surrounding the tubes such that the leakage direction is from fresh air into the exhaust flow. When the breathable fresh air exits from the heat exchanger 14, the axial fan 32 will produce a pressure on the fresh air side of the heat exchanger 14 that is everywhere higher than the exhaust gas side thereof. This produces a heat exchanger that is inherently safe from possible leakage of dangerous exhaust gases into the breathable heated air.

With reference again to FIG. 3, a modification to the preferred embodiment, especially suitable for outdoor construction applications, is illustrated wherein heated air is produced using a catalytic element 80 located within the heat exchanger assembly 14d in which identical elements are indicated with identical reference numerals and similar elements are indicated with primed reference numerals. Since the combustor (not shown) on the gas turbine engine 12 produces significantly less carbon monoxide (CO) compared to a gasoline spark ignition engine, a properly fitted catalytic element 80 on the gas turbine engine 12 can reduce the emissions to acceptable levels. As such, the use of the catalytic element 80 greatly reduces the weight of the turbo heater 10 as well as the size and cost. The catalytic element 80 is fitted directly to the gas turbine engine exhaust 50' by means of a diffuser duct 52'. The exhaust from the catalytic element 80 will be 1250° F. to 1300° F. maximum and the additional air flow from the axial fan 32 will pass around the catalytic element 80 and within the volume defined by housing 56' for mixing and blending with fresh air to produce a relatively even discharge temperature of approximately 350° F. In this manner, the efficiency of the turbo heater 10 can approach 97%, depending upon the amount of electrical power being concurrently generated.

Alternately, some applications where human consumption of the heated air is not a requirement, a heat exchanger or catalytic converter may not be required, but the exhaust gas from the gas turbine engine 12 may be subsequently mixed with fresh air from the axial fan 32 to produce a heated mixture of exhaust gases and air.

With continued reference to all of the figures, the amount and temperature of the heated air produced by the turbo heater 10 can be controlled over a broad range by means of fuel flow adjustment, and back pressuring either the turbine 22, the axial fan 32 or any combination thereof. Furthermore, a minor amount of modulation can be accomplished by adjusting the amount of electrical power produced by electrical generator set 28. More specifically, the amount of fuel basically determines the operating speed of the gas turbine engine 12, and thus the speed of the axial fan 32. Once the initial speed is set, the minimum amount of fuel and heat is determined, as well as the maximum fan flow for this speed setting. Back pressuring the gas turbine engine 12 increases the amount of fuel necessary to hold the speed setting constant and increases the gas temperature entering the heat exchanger 14, thereby raising the delivered air temperature. Back pressuring the heat exchanger 14 increases the fan pressure, thereby reducing the fan air flow and again increasing the delivered air temperature. Similarly, increasing the amount of electrical power generated requires more fuel to hold constant speed, thereby increasing the heat input to the heat exchanger 14 by a minor amount. In the preceding manner, a broad range of heat input, air temperature and air flow can be modulated for the desired operating conditions within the rating of the turbo heater 10. A more conventional means of heat modulation or temperature control is to simply turn the turbo heater 10 on and off using a conventional thermostat which may be incorporated into a controller 300 or remotely located.

The turbo heater 10 is self-contained and nearly instantaneously starting, and will operate at a minimum heat output on a reasonable on-off cycle for lower heat requirements. Operation of the turbo heater 10 in this manner would provide an environment of uniform heat, using the minimum fuel necessary. As such, the turbo heater 10 is an ideal source of heated air as it can supply a large quantity of heat at relatively low ambient temperatures. For example, while nominally rated at 500,000 Btu/hr, the turbo heater 10 can be modulated from less than 250,000 Btu/hr to greater than 750,000 Btu/hr at an ambient temperature of minus 50° F.

Referring now to FIGS. 4–7, the details of the gas turbine engine 12 will be further discussed. As with all manufactured items, the components of the turbo heater 10 can only be manufactured to within a given tolerance. To accommodate variations due to these tolerances, nearly all gas turbine engines operating over 30,000 rpm must incorporate some form of elastic or damped bearing assembly for high speed shaft assembly 24, to minimize the resulting bearing loads which would become prohibitive due to the inability to achieve a perfect balance on the turbine shaft. Thus, the shaft assembly 24 is rotatably supported on rear and front bearing assemblies 110, 146 which are elastically supported to allow the shaft assembly 24 to rotate substantially on its mass center, as determined by the balance tolerance.

Figure 5:
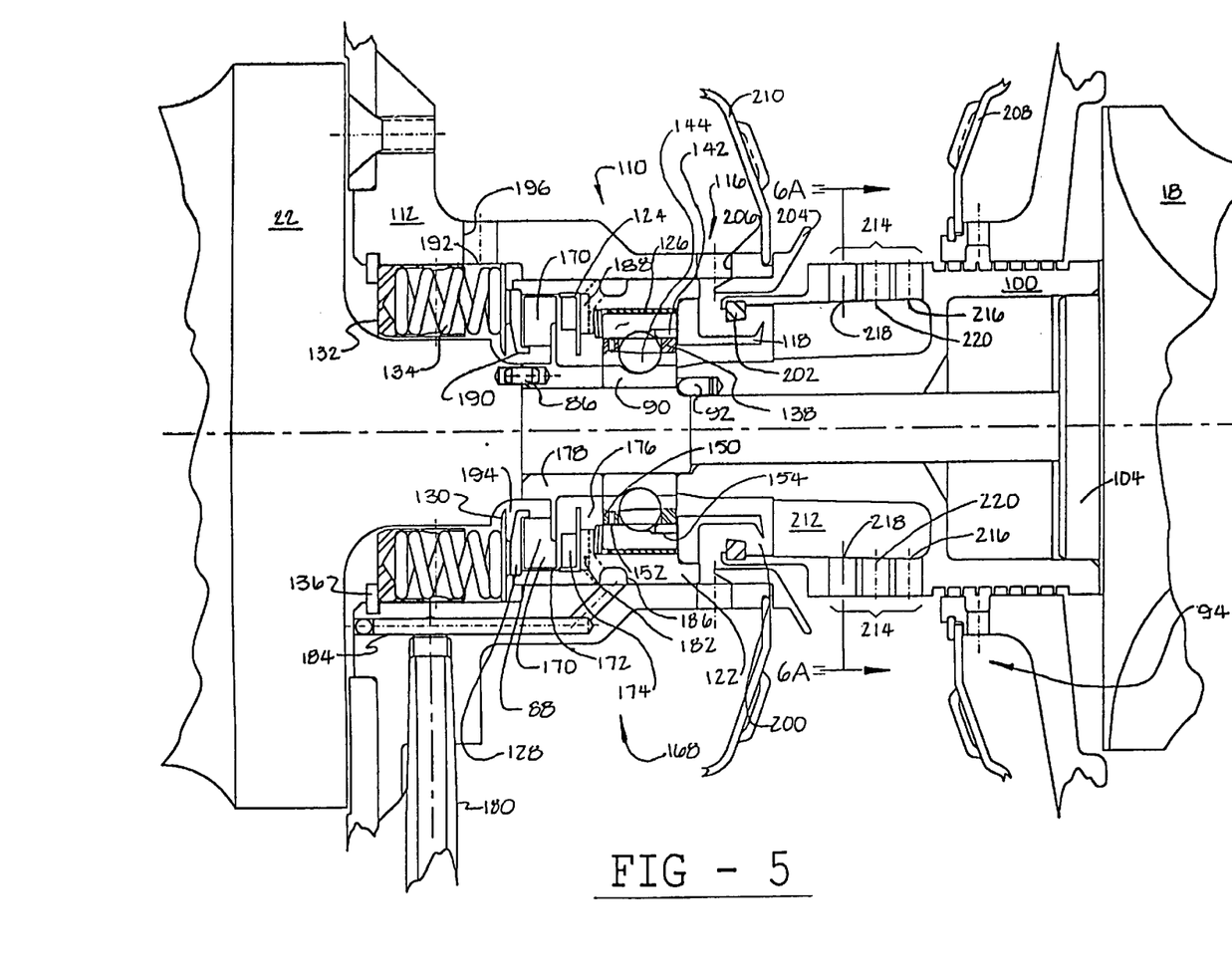
FIG. 5 is a detailed view illustrating the nozzle hub, rear bearing assembly and fuel slinger of the gas turbine engine illustrated in FIG. 2.

Referring now to FIGS. 4 and 5, the high speed shaft assembly 24 is defined by turbine 22, anti-rotation pin 86, scavenger blower 88, rear bearing inner race 90, timing pin 92, center shaft assembly 94, front bearing inner race 96, pinion gear 64 and tie nut 98. The center shaft assembly 94 is located forward of the turbine 22 and the scavenger blower 88 and includes fuel slinger 100, compressor 18 and front seal carrier 102. The fuel slinger 100 is a press fit onto a pilot spigot 104 which is formed as a part of the compressor 18.

The compressor 18 is piloted and pressed onto the front seal carrier 102, and the front bearing inner race 96 is mounted on the front seal carrier 102. The pinion gear 64 is fitted into the front bearing inner race 96. The front seal carrier 102 and the pinion gear 64 are driven positively by means of mating shaft half lap joints 106 piloted inside the front bearing inner race 96. All of the previously described components of shaft assembly 24 are bolted together by means of a long tie bolt 108 attached to the turbine 22 and secured by a tie nut 98 tightened against the pinion gear 64. When assembled, the tie bolt 108 is sufficiently stretched such that the shaft assembly 24 acts as a rigid body.

High speed shaft assembly 24 is rotatably supported by rear bearing structure 110 which is disposed within nozzle hub 112 extending from turbine nozzle assembly 114. The rear bearing assembly 110 includes rear bearing set 116, fuel deflector 118, belville spring 120, rear bearing holder 122, fuel shield 124, rear beam spring assembly 126, scavenger blower cover 128, pick up plate 130, turbine seal 132, compression springs 134, and retaining ring 136. Rear bearing set 116 includes bearing cage 138, rear bearing outer race 140, and graphite rub ring 142 and ball bearing 144.

An axial preload is applied to the rear bearing assembly 110 primarily by means of six compression springs 134 circumferentially disposed about the rear end (i.e. turbine end) of the shaft assembly to apply a force on the order of approximately 18 to 20 pounds. Additionally, two belville springs 120 locate the rear bearing set 116 in the rear bearing holder 122. The combination of compression springs 134 and belville springs 120 in series urge the shaft assembly 24 forward such that front bearing assembly 146 engages front bearing shim plate 148, thereby locating the position of the shaft assembly 24 in the gas turbine engine 12. Providing a uniform axial load at high frequency is important to control axial vibration, which if induced, would cause an impact load on the rear and front bearing assemblies 110, 146, thereby reducing their life. The amplitude of such an impact load is proportional to the vibrational amplitude which is controlled and greatly reduced by the axial loading provided in the present invention. The belville springs 120 and compression springs 134 define a spring means which is designed such that the natural frequency of the shaft assembly 24 in the axial direction greatly exceeds the rotational operation frequency of the shaft assembly 24. Thus, if the spring response is not in excess of the operational axial frequency of the shaft assembly 24, the outer bearing race 140 will separate from the ball bearing 144 and rear bearing inner race 90 and severely damage the rear bearing assembly 110 in a relatively short period of time.

As previously mentioned, the rear bearing set 116 is elastically supported by eight radial beam springs 126 disposed circumferentially between rear bearing outer race 140 and rear bearing holder 122. The rear radial beam springs 126 must also respond at a frequency greater than the operating rotational frequency of the shaft assembly 24. As presently preferred, the beam springs 126 are designed to have a preload of approximately 6 to 7 pounds and a spring rate between 6,000 and 7,000 pounds per inch resulting in a natural frequency of three to five times the operating speed of shaft assembly 24. This combination of preload, spring rate and natural frequency is believed to have successfully minimized the radial impact loading on the rear bearing set 116, while allowing the shaft assembly 24 to rotate on its mass center.

High speed shaft assembly 24 is also rotatably supported by front bearing assembly 146 which is disposed within the front bearing support 156 fixedly coupled to engine housing 158. The front bearing assembly 146 includes front ball bearings 160, front bearing outer race 162, and front beam springs 164. More specifically, the front bearing assembly 146 is supported by eight radial beam springs 164 disposed circumferentially between front bearing outer race 162 and front bearing support 156. The elastic suspension provided by front beam springs 164, like the rear beam spring assembly 126 of rear bearing assembly 110, accommodates minor imbalances in the shaft assembly 24.

Likewise, the pinion gear 64 is elastically supported by the front bearing assembly 146 which also provides an initial centering force. More specifically, the front end of shaft assembly 24 runs in its balance orbit, which is typically less than 2% of the total available radial travel. The remaining radial travel, approximately 98%, provides a means of load sharing between the counter-rotating gear sets 66, 68 which amounts to a load correction of about 4% of the maximum tooth load. The elasticity of the system and the resulting load adjustment assist in the smooth tooth action necessary for long life of high speed gears and also accommodate the dimensional tolerances necessary for manufacturing. The inertia of the front end of shaft assembly 24 and the resulting load correction force are such that the movement will take place over a number of cycles. The resulting small but important load sharing and its relatively slow adjustment work harmoniously to greatly reduce the tooth wear on these very high speed gears which provides a significant manufacturing cost reduction for this small high speed turbomachine. As presently preferred, front bearing assembly 146 is disposed within the gear box housing 166 such that cooling and lubrication is provided by oil pump 72 of gear box 26.

The rear bearing set 116 is adapted for high temperature air, fuel, fuel vapor and limited liquid fuel lubrication and cooling, well beyond the limits of other bearing assemblies. The rear bearing set 116 features the use of commercial-grade inner and outer bearing races 90, 140 fitted with ceramic silicon nitride balls 144, which are approximately fifty percent (50%) lighter than conventional tool steel balls. Therefore, the centrifugal load applied on the outer bearing race 140 by the balls 144 is similarly reduced. This lighter load allows the commercial outer bearing race 140 to survive the adverse conditions of high speed, high temperature and reduced lubrication.

The rotation of shaft assembly 24 under normal operation causes the rear bearing cage 138, which rotates at a speed about one-half of the shaft speed, to move in a compound orbital motion (i.e., a series of smaller higher frequency orbits superimposed on the center of rotation of the shaft assembly 24) resulting in the potential for impact of the bearing cage 138 on the outer race 140 which would reduce performance and life to an unacceptable level. As will be further described hereinafter, rear bearing assembly 110 is cooled and lubricated by combustion fuel, namely diesel fuel or fuel oil. The bearing cage 138 functions as a centrifugal fluid separator of the air, fuel vapor and liquid fuel mixture delivered to the rear bearing set 116 for dynamically centering purposes. More specifically, liquid fuel provided to the rear bearing set 116 is centrifuged into an annular groove 150 formed in the bearing cage 138 which is in fluid communication with nine radial holes 152 located in bearing cage 138 such that high velocity streams of liquid fuel issue from holes 152 and have a tendency to center the bearing cage 138 in the bearing outer race 140. When the bearing cage 138 approaches the outer race 140, the radius from the center of rotation increases. This increased radius creates a higher pressure, thereby increasing the velocity of the fuel flowing through the holes 152.

The resulting thrust exerted on one side of the bearing cage 138 is increased with a reverse effect occurring on the opposite side to reduce the thrust thereon. This thrust modulation stabilizes the movement of the bearing cage 138 by providing a centering force directed toward the center of rotation of shaft assembly 24. The rear bearing set 116 further includes a graphite rub ring 142 disposed in a relief 154 formed in rear bearing outer race 140. The graphite rub ring 142 provides a low friction, dry lubricating material and a non-galling surface in the event of contact by the rear bearing cage 138 such as during initial start-up when insufficient amounts of fuel are passed therethrough to generate the centering force. The operational life of rear bearing assembly 110 is significantly increased by providing a dynamically centered bearing cage and graphite rub ring such that the rear bearing assembly 110 performs successfully in the adverse environment of the gas turbine engine 12.

As previously mentioned, the metered fuel used for combustion is directed through the rear bearing set 116, for cooling and lubrication thereof. Since the fuel consumption of gas turbine engine 12 varies significantly depending on the operational parameters of the turbo heater 10, the combustion fuel must be conditioned to insure adequate cooling and lubrication particularly during low fuel consumption periods such as idling. To this end, scavenger blower assembly 168 is located near the turbine 22 at the far end of high speed shaft assembly 24 and provides a high speed mixed flow (i.e. air, fuel vapor and liquid fuel) to rear bearing set 116. While the scavenger blower assembly 168 is typically used to pump hot air, the design of the scavenger blower 88, and more specifically the blades 170 formed thereon and the size of scavenger blower 88 relative to annulus 172 in which it operates, provides means of preventing liquid fuel and vapor from back flowing (i.e. flowing from the compressor-side to the turbine-side of the rear bearing assembly 110) once the shaft assembly 24 is turning, even at relatively low speeds.

Referring now to FIG. 5, eight pump impeller blades 170 are circumferentially disposed on the scavenger blower 88 and extend radially inwardly therefrom. The fuel shield 124 also has a plurality of vanes or fins 174 formed therein adjacent the scavenger blower blades 170. More specifically, fins 174 are formed from the outer lip of the fuel shield and extend radially inwardly therefrom. The fuel shield fins 174 diffuse the rapidly rotating diesel fuel that tends to enter the annulus 172 at initial start up and direct it to the annulus 176 located between the blower hub 178 and the fuel shield 124. The metered fuel for engine control is introduced into the rear bearing holder 122 by means of a fuel feed tube 180 into the nozzle hub 112 and acts as a sliding rotary joint between the bearing holder 122 and the nozzle hub 112. An annular ring 182, which is formed in the bearing holder 122, extends radially inwardly between the fuel shield 124 and the rear bearing set 116 and serves to locate the rear engine bearing set 116, thereby providing a spring stop for the belville springs 120 which biases shaft assembly 24 as previously described.

Fuel is communicated from the fuel feed tube 180 through a fuel passageway 184 formed in the nozzle hub 112 which feeds a groove 186 formed in the bearing holder 122 which communicates with a fuel passageway 188 formed through bearing holder 122 that terminates between the annular ring 182 and the fuel shield 124. The annulus 176 is formed by the fuel shield 124 and the annular ring 182 in the center of these parts prior to entering the annulus 172 formed by the hub 178 of scavenger blower 88 and the inner diameter of both the fuel shield 124 and the annular ring 182. Fuel entering scavenger blower assembly 168 is believed to wet the lip on the forward edge of the fuel shield 124 such that it is mixed and atomized by the air pumped by the scavenger blower 88, thereby preventing passage of the air-fuel mixture past the scavenger blower cover 128.

The scavenger blower 88 is sealed with a cover 128 and a pick up plate 130, both of which are held in place with the compression springs 134 and the turbine seal 132 locked in place with a retaining ring 136. As previously described, the compression springs 134 supply the necessary axial load for the angular contact of ball bearings 144 with inner and outer races 90,140 that support the high speed shaft assembly 24. The scavenger blower cover 128 seals the scavenger blower 88 and provides the necessary operating clearance. The scavenger blower cover 128 has an entry lip 190 extending radially inward for retaining the fuel within scavenger blower assembly 168 during start up and low speed operation. The pick up plate 130 further prevents the leakage of a minor amount of fuel from the scavenger blower cover 128 and from the clearance space between the rear bearing holder 122 and the nozzle hub 112. More specifically, the outer diameter of the pick up plate 130 is closely matched to the bore 192 formed in the nozzle hub 112 such that a clearance space 194 is provided between the pick up plate 130 and the scavenger blower cover 128 to draw leakage fuel into the scavenger blower cover 128. Furthermore, the scavenger blower cover 128 is beveled to create a pressure differential therebetween. This pressure differential draws the leakage fuel back into the scavenger blower assembly 168, thereby preventing emission of unburned fuel in the turbine exhaust. In the running state, the cavity pressure surrounding the pick up plate 130 is higher than the pressure in the combustor 20 which tends to make the air and fuel flow forward into the combustor 20, in addition to the effort from the scavenger blower 88.

The scavenger blower 88 draws hot air through primary holes 196 formed in turbine nozzle assembly 114 into an annulus 176 formed by the bearing holder 122 and shaft assembly 24 where it mixes with fuel and is driven past the fuel shield 124 and the annular ring 182. The fuel, which has been heated through contact with the heated metal surfaces of nozzle hub 112 is partially vaporized and mixes with the hot air to form a mixture of air, fuel vapor and hot fuel that is passed through the bearing set 116 such that the mixture subsequently lubricates and cools the rear bearing set 116.

It should be noted that the cooling and lubrication of rear bearing set 116 occurs in various ways depending upon the operating state of the gas turbine engine 12. In a first starting state associated with starting of the gas turbine engine 12, a one-phase combustion fuel (liquid fuel) wants to back flow until the rear bearing set 116 warms up and the shaft assembly 24 is rotating in at least an idling range. During the engine starting state (and particularly during cold starting), the scavenger blower assembly 168 scoops liquid fuel tending to back flow from the scavenger blower 88 and drives it upwardly and through the rear bearing set 116. In a second running state with the gas turbine engine 12 is running, the fuel flow quickly changes to a two-phase combustion fuel (liquid fuel and air) and then a three-phase combustion fuel (liquid fuel, fuel vapor and hot air) which tends to flow in a forward direction through the bearing set 116.

The three-phase combustion fuel exits from the rear bearing set 116 and impinges upon the fuel deflector 118 which delivers the combustion fuel to the fuel slinger 100, a rotating component of the shaft assembly 24, such that fuel is centrifugally driven forwardly and outwardly through the inner cavity 200 of the fuel slinger 100. A dam ring 202 is located on the fuel slinger 100 and a retainer/rear liner 204 is located on nozzle hub 112 to direct fuel, which might otherwise back flow into the exhaust gas, into the combustor 20 where it is consumed. The dam ring 202 is internally tapered to direct any fuel landing thereon forwardly into the fuel slinger cavity 200. The nozzle hub 112 has a series of eight (8) secondary holes 206 drilled at an angle to pressurize and add swirl to the area immediately adjacent the retainer/rear liner 204, thereby propelling any fuel/air mixture out of the clearance between the fuel slinger 100 and the retainer/rear liner 204.

Figures 6A, 6B, 6C:
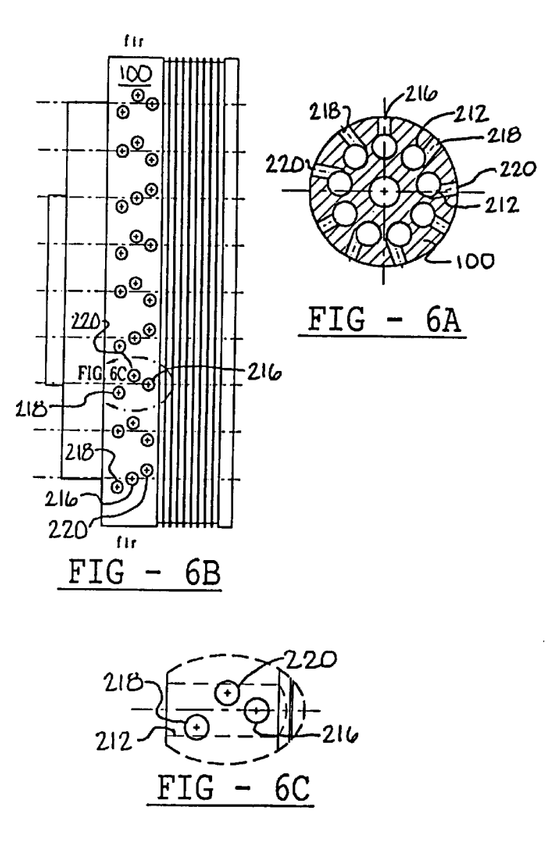
FIG. 6A is a cross-sectional view illustrating the passageways formed in the fuel slinger of the gas turbine engine illustrated in FIG. 2.
FIG. 6B is a circumferential projection of the fuel slinger illustrating the repeating pattern of passageways formed therein.
FIG. 6C is a detailed view of a group of fuel holes in fluid communication with the passageways.

The fuel slinger 100 provides the final atomization and mixing of the combustion fuel, and more specifically functions as a rotary atomizer which intensely atomizes and cylindrically distributes the fuel across the axial gap between the front combustor liner 208 and the rear combustor liner 210. Nine (9) passageways defined by axial bores 212 and nine (9) groups of three (3) fuel holes 214 are formed in fuel slinger 100 and extend forwardly (toward the compressor 18) and radially outwardly from inner cavity 200 relative to the longitudinal axis a—a of the fuel slinger 100. The fuel slinger 100 has nine (9) groups of fuel holes 214, each group having a pattern of three (3) radial holes 216, 218, 220 (or a total of 27 holes). Each group of fuel holes 214 provide fluid communication from one of the axial bores 212 to combustor 20. The nine axial bores 212 and the nine (9) groups of fuel holes 214 are generally equally spaced around the circumference of the fuel slinger 100 with the pattern of three holes 216, 218, 220 in each group of holes 214 being longitudinally and slightly angularly displaced from one another. Moreover, the holes 216, 218, 220 are oriented radially outwardly to insure a high velocity delivery thereto.

Referring now to FIGS. 5 and 6A–6C, each pattern of three holes 216, 218, 220 are generally centered in the gap between the combustor liners 208, 210 and are drilled into each of the axial holes 212, with one radial hole 216 being disposed on the centerline thereof and the remaining two semi-radial holes 218, 220 being disposed on alternate sides of the centerline. When the fuel enters the slinger cavity 200, centrifugal force slings the fuel to the axial bore 212 where it flows forwardly as a narrow trough therein toward the compressor 18. The volume of fuel determines which of the three holes 216, 218, 220 will dispense the fuel into the combustor 20. More specifically, the radial hole 216 which is aligned with the centerline of axial bore 212 will receive the greatest amount of fuel of the three holes. The semi-radial holes 218, 220 will receive a lesser amount of fuel but provide additional fuel atomizing capacity over a slinger having only a radial hole.

As presently preferred, the location of the radial hole 216 is alternated between a forwardmost position f, an intermediate position i and a rearwardmost position r for each adjacent axial bores 212. In this manner, the position of the maximum fuel flow from any given group of fuel holes 214 is alternated axially, thereby yielding an extremely uniform fuel spray having a generally cylindrical distribution about the fuel slinger 100 which provides for the excellent combustion characteristics within the combustor 20. Moreover, the fuel flow in the combustor 20 is designed to have a characteristic swirl with the primary combustion located forwardly in combustor 20 and the remaining combustion as the gases progress therethrough.

With reference again to FIGS. 4 and 5, combustor 20 is defined by the front combustor liner 208 and the rear combustor liner 210 described, as well as a outer combustor liner 222. More specifically, the outer combustor liner 222 is attached to a radially outward portion of front combustor liner 208, and a plurality of combustor feed tubes 224 extend radially inward from outer combustor liner 222 and open onto nozzle hub 112. The rear combustor liner 210 is attached to nozzle hub 112 which along with turbine nozzle assembly 114 defines a chamber 226 therebetween. The configuration of the combustor 20 is such to provide proper flame holding characteristics once the gas turbine engine 12 has been started to make the gas turbine engine 12 self-sustaining. The combusted gases are exhausted between exhaust cover 228 and outer combustor liner 222 and directed through turbine nozzle cover 230 so as to impinge on turbine 22, thereby driving shaft assembly 24. The combusted gases are then exhausted through the exhaust port 232 and exhaust header pipe 50 into diffuser duct 52.

With reference now to FIG. 1, the turbo heater 10 is provided with an engine controller 300 which is operably coupled to a rotor speed pick up 302 and an EGT (exhaust gas temperature) sensor 304 for providing engine operating parameters thereto. An ignition system 306 having an ignition coil 308 and a spark plug 310 are also operably coupled to the engine controller 300 for initiating combustion. Controller 300 is also operably coupled to electronic fuel system 60 which includes a fuel supply 62 of the type previously described and an electric fuel pump 312 that pumps fuel to fuel passageway 180 formed in gas turbine engine 12. Similarly, a starting system 314 having the starter motor 34 which is adequately sized to insure adequate power to start the gas turbine engine 12 during very cold weather is operably coupled to the controller 300.

The starting system 314 preferably utilizes a soft start circuit 316 which limits the electrical current drawn by the starter motor 34 from the battery 318. The soft start circuit 316 features a first or soft circuit 320, a second or normal circuit 322 which are selectively actuated by controller 300. The soft circuit 316 has a resistance element 324 interdisposed between the battery 318 and the starter motor 34. As presently preferred resistance element is a coil of 0.093 inches in diameter stainless steel wire with straightened length of 10 inches within a resistance of about 0.0084 ohms as compared to the copper conductor of less than 0.0012 ohms. As illustrated in FIG. 1, the coil 324 of soft circuit 320 is enclosed in a housing 326 through which fuel passes so that the heat generated by the coil 324 may be partially recovered by preheating the fuel prior to combustion, thereby further enhancing cold weather starting of the gas turbine engine 12.

The start sequence of turbo heater 10, as controlled by engine controller 300, proceeds as follows. The system is turned "ON" and a low current is drawn through soft circuit 320 by the starter motor 34 for initiating rotation of the shaft assembly 24 with a low torque. The lower torque, resulting from the high resistance of coil 324, gently engages the clutch 36 and relatively slowly accelerates the gas turbine engine 12. The spark plugs 310 are firing, but the electronic fuel pump 312 has not initiated fuel flow. As presently preferred, a two-spark plug arrangement is used to ensure starting particularly in cold weather conditions. After approximately two seconds when the gas turbine engine 12 is being driven at a steady low rpm speed, the controller 300 selectively actuates second circuit 322 and a high current is drawn therethrough by the starter motor 34 which quickly accelerates the speed of the shaft assembly 24. The above-described start sequence is beneficial to the overall system in two ways. First, it improves the cold temperature starting capability of the engine by eliminating large current draws on the battery. Secondly, it eliminates high torque loading between the starter 34 and the turbine shaft assembly 24 by allowing the rotating components to slowly achieve operational speed.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

What is claimed is:

1. A gas turbine engine for use in a turbo heater comprising:
   an engine housing;
   a compressor and a turbine disposed on a shaft assembly;
   a combustor in fluid communication with said compressor and said turbine; and
   a bearing assembly rotatably supporting said shaft assembly within an engine housing, the bearing assembly including:
   an inner race formed on the shaft assembly;
   an outer race supported within a bearing holder;
   a plurality of bearings interdisposed between said inner race and said outer race for rotatably supporting said shaft assembly about a center of rotation; and
   a bearing cage interdisposed between said inner race and said outer race for retaining said plurality of bearings, said bearing cage having a plurality of radial holes formed therethrough to provide fluid communication between said inner race and said outer race such that a bearing lubricant issuing from said plurality of radial holes generates a force which centers said bearing cage about said center of rotation.

2. The gas turbine engine of claim 1 wherein said bearing cage has an annular groove formed on a surface thereof and in fluid communication with said plurality of radial holes formed in said bearing cage.

3. The gas turbine engine of claim 1 further comprising a rub ring interdisposed between said inner and outer races adjacent said bearing cage for providing a low friction, dry lubricating material.

4. The gas turbine engine of claim 3 further comprising a graphite rub ring.

5. The gas turbine engine of claim 1 wherein said bearing assembly is elastically supported within said bearing holder such that said shaft assembly is allowed to rotated about a center of mass.

6. The gas turbine engine of claim 5 further comprising a plurality of radial beam springs interdisposed between said outer race and said bearing holder for elastically supporting said bearing assembly.

7. The gas turbine engine of claim 1 further comprising a spring member applying an axial load to said bearing assembly for defining a characteristic natural frequency of said shaft assembly which is greater than an operational frequency of the shaft assembly.

8. The gas turbine engine of claim 7 further comprising a belville spring operably disposed between said bearing holder and said outer bearing race.

9. The gas turbine engine of claim 7 further comprising a compression spring operably disposed between said engine housing and said bearing holder.

10. The gas turbine engine of claim 7 wherein said spring member comprises a compression spring operably disposed between said engine housing and said bearing holder, and a belville spring operably disposed between said bearing holder and said outer bearing race.

11. A gas turbine engine for use in a turbo heater comprising:
    a turbine nozzle assembly disposed within an engine housing and supporting a nozzle hub;

a shaft assembly disposed within said nozzle hub and defining an annulus therebetween;

a bearing assembly disposed within said annulus and rotatably supporting said shaft assembly in said nozzle hub;

a turbine operably disposed on a first end of said shaft assembly;

a compressor operably disposed on a second end of said shaft assembly;

an annular combustor concentrically disposed about the shaft assembly between the compressor and the turbine;

a fuel feed tube for delivering fuel to said annulus through a first fuel passageway formed in said nozzle hub and a second fuel passageway formed in a portion of said bearing assembly;

a scavenger blower assembly disposed within said annulus, said scavenger blower assembly including a scavenger blower coupled to said shaft assembly for rotation therewith and having a plurality of blades, a scavenger blower cover positioned adjacent to said scavanger blower, and a fuel shield positioned adjacent said second fuel passageway; and said nozzle hub having a compressed air passageway formed therethrough such that said scavenger blower assembly is operable to direct compressed air from said compressor past said second fuel passageway for mixing fuel with said compressed air to form an air-fuel mixture and passing said air-fuel mixture through said bearing assembly for cooling and lubricating said bearing assembly.

12. The gas turbine engine of claim 11 wherein said fuel shield has a plurality of fins formed on a side thereof proximate said scavenger blower and extending radially inwardly.

13. The gas turbine engine of claim 11 wherein said scavenger blower assembly further comprises a pick-up plate disposed in said annulus adjacent said scavenger blower cover.

14. The gas turbine engine of claim 11 further comprising a fuel deflector disposed in said annulus on a side of said bearing assembly opposite said scavenger blower assembly.

15. The gas turbine engine of claim 14 wherein said nozzle hub has at least one radial hole formed therethrough adjacent said fuel deflector for propelling said air-fuel mixture through said bearing assembly.

16. The gas turbine engine of claim 11 wherein said bearing assembly comprises:

an inner bearing race, an outer bearing race and a plurality of bearings interdisposed therebetween; and a bearing holder disposed in said annulus between said bearing outer race and said nozzle hub, said second fuel passageway formed through said bearing holder.

17. The gas turbine engine of claim 16 wherein said bearing holder has an annular ring formed thereon, said annular ring disposed between said fuel shield and said outer bearing race and extending radially inwardly.

18. A gas turbine engine for use in a turbo heater comprising:

a turbine nozzle assembly disposed within an engine housing and supporting a nozzle hub;

a shaft assembly disposed within said nozzle hub and defining an annulus therebetween;

a bearing assembly disposed within said annulus and rotatably supporting said shaft assembly in said nozzle hub;

a turbine operably disposed on a first end of said shaft assembly;

a compressor operably disposed on a second end of said shaft assembly;

an annular combustor concentrically disposed about the shaft assembly between the compressor and the turbine;

a fuel feed tube for delivering fuel to said annulus;

a fuel slinger coupled to said shaft assembly for rotation therewith, said fuel slinger having an inner cavity and a plurality of passageways formed therein to provide fluid communication between said annulus and said annular combustor, each of said plurality of passageways including an axial bore and at least one fuel hole formed therein such that rotation of said fuel slinger causes fuel to be cylindrically distributed into said combustor.

19. The gas turbine engine of claim 18 wherein the longitudinal position of said at least one fuel hole is varied among said plurality of passageways.

20. The gas turbine engine of claim 18 wherein said at least one fuel hole further comprises a first fuel hole and a second fuel hole.

21. The gas turbine engine of claim 20 wherein said first fuel hole is a radial hole disposed along a centerline of said axial bore and said second fuel hole is a semi-radial hole disposed slightly offset from said centerline.

22. The gas turbine engine of claim 21 wherein each of said radial hole and said semi-radial hole are arranged in one of a first longitudinal position and a second longitudinal position to define a pattern such that said pattern is varied among said plurality of passageways.

23. The gas turbine engine of claim 18 wherein said at least one fuel hole further comprises a radial hole disposed along a centerline of said axial bore and a first semi-radial hole disposed slightly offset from said centerline and a second semi-radial hole disposed slightly offset of said centerline on a side opposite said first semi-radial hole.

24. The gas turbine engine of claim 23 wherein each of said radial hole, said first semi-radial hole and said second semi-radial hole are arranged in one of a first longitudinal position, a second longitudinal position and a third longitudinal position to define a pattern such that said pattern is varied among said plurality of passageways.

25. The gas turbine engine of claim 18 wherein each of said plurality of passageways extends axially and radially outwardly from said inner cavity relative to a longitudinal axis of said fuel slinger.

26. The gas turbine engine of claim 18 wherein said fuel slinger further comprises a dam ring disposed in said fuel slinger adjacent said inner cavity.

27. The gas turbine engine of claim 18 further comprising a retainer disposed on said nozzle hub adjacent an outer surface of said fuel slinger opposite said inner cavity.

28. The gas turbine engine of claim 27 wherein said nozzle hub has at least one radial hole formed therethrough adjacent said retainer.

* * * * *